United States Patent
Chevli

(12) 
(10) Patent No.: US 7,442,243 B2
(45) Date of Patent: *Oct. 28, 2008

(54) INKJET INK SET

(75) Inventor: Samit N. Chevli, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/490,598

(22) Filed: Jul. 21, 2006

(65) Prior Publication Data

US 2007/0030324 A1 Feb. 8, 2007

Related U.S. Application Data

(60) Provisional application No. 60/705,652, filed on Aug. 4, 2005.

(51) Int. Cl.
*C09D 11/02* (2006.01)
*B41J 2/01* (2006.01)

(52) U.S. Cl. .................................. 106/31.37; 347/100

(58) Field of Classification Search ............. 106/31.27; 347/100
See application file for complete search history.

(56) References Cited

U.S. PATENT DOCUMENTS

| | | | |
|---|---|---|---|
| 5,910,812 A * | 6/1999 | Yamamoto et al. | 347/106 |
| 6,302,948 B1 * | 10/2001 | Lin et al. | 106/31.37 |
| 6,426,766 B1 * | 7/2002 | Shirota et al. | 347/106 |
| 6,723,137 B1 * | 4/2004 | Hakamada et al. | 8/549 |
| 2006/0185099 A1 * | 8/2006 | Chevli | 8/471 |

FOREIGN PATENT DOCUMENTS

| | | |
|---|---|---|
| EP | 0 633 345 A2 | 1/1995 |
| EP | 0 693 588 A2 | 1/1996 |
| WO | WO 2006/091957 A2 | 8/2006 |

OTHER PUBLICATIONS

PCT International Search Report and Written Opinion for International Application No. PCT/US2006/030030 dated Apr. 5, 2007.

* cited by examiner

*Primary Examiner*—Helene Klemanski

(57) ABSTRACT

The present invention pertains to an aqueous inkjet ink set based on disperse dye colorants and, more particularly, to such an inkjet ink set particularly suitable for printing on polyester and polyester blend textiles, such as automotive textile stock, so that the printed fabric is colorfast when exposed to light.

10 Claims, No Drawings

INKJET INK SET

CROSS-REFERENCE TO RELATED APPLICATION

This application claims priority under 35 U.S.C. §119 from U.S. Provisional Application Ser. No. 60/705,652, filed Aug. 4, 2005.

BACKGROUND OF THE INVENTION

The present invention pertains to an aqueous inkjet ink set based on disperse dye colorants and, more particularly, to such an inkjet ink set particularly suitable for printing on polyester and polyester blend textiles, such as automotive textile stock, so that the printed fabric is colorfast when exposed to light.

Digital printing methods such as inkjet printing are becoming increasingly important for the printing of textiles and offer a number of potential benefits over conventional printing methods such as screen printing. Digital printing eliminates the set up expense associated with screen preparation and can potentially enable cost-effective short run production. Inkjet printing furthermore allows visual effects, like infinite pattern repeat sizes, that cannot be practically achieved with a screen printing process.

One area of textile printing ideally suited to digital printing is the textiles needed for the automotive interior market where short runs are common and specialized printed textiles are sought. However, printing of automotive textiles presents unique challenges. For example, the colors in the printed ink must be colorfast under the harsh light and heat conditions of an automotive interior. If some slight fading does occur the color components should have a matched slight fading so the printed textile retains its color and color contrasts. It is an object of this invention to provide an inkjet ink set having good gamut and lightfastness. If the lightfastness is affected by light the loss in color is slight and even with the loss in color the printed textile appears to have uniform properties.

SUMMARY OF THE INVENTION

In accordance with one aspect of the present invention, there is provided an inkjet ink set comprising at least three differently colored inks, wherein:

at least one of the colored inks is magenta in color ("M" ink) and comprises a first aqueous vehicle and a magenta disperse dye colorant selected from the group consisting of DR60, DR82, DR86, DR86: 1, DR167:1, DR279 and mixtures thereof;

at least one of the colored inks is yellow in color ("Y" ink) and comprises a second aqueous vehicle and a yellow disperse dye colorant selected from the group consisting of DY64, DY71, DY86, DY114, DY153, DY233, DY245 and mixtures thereof; and at least one of the colored inks is cyan in color ("C" ink) and comprises an aqueous vehicle and a cyan disperse dye colorant the disperse dye in the cyan ink is selected from the group consisting of DB27, DB60, DB73, DB77, DB77:1, DB87, DB257, DB367 and mixtures thereof.

More preferably, the disperse dye in the magenta ink is selected from the group consisting of DR86, DR86: 1, DR60, DR82 and mixtures thereof; the disperse dye in the yellow ink is selected from the group consisting of DY86, DY1 14, DY71, DY64 and mixtures thereof; and the disperse dye in the cyan ink is selected from the group consisting of DB60, DB77, DB77:1, DB27, DB73 and mixtures thereof.

The inkjet ink sets may contain other colored inks, such as a colored ink comprising a fourth aqueous vehicle and a disperse dye colorant selected form the group consisting of DV26, DV33, DV36, DV57 and mixtures thereof; and/or a colored ink comprising a fifth aqueous vehicle and a disperse dye colorant selected form the group consisting of DO30, DO41, DO61 and mixtures thereof.

In another preferred embodiment, the ink set further comprises an ink that is black in color ("K" ink) comprising a sixth aqueous vehicle and a black disperse dye colorant. The black disperse dye colorant can be a black disperse dye, but is preferably a mixture of differently colored disperse dyes chosen such that the mixture is black in color.

In yet another aspect, the present invention pertains to a method for ink jet printing, comprising the steps of:

(a) providing an ink jet printer that is responsive to digital data signals;

(b) loading the printer with a fabric substrate to be printed;

(c) loading the printer with an inkjet ink set as set forth above and as described in further detail below; and (d) printing a print onto the fabric substrate using the inkjet ink set in response to the digital data signals.

Optionally (and preferably), the process further comprises the following steps:

(e) fixing the disperse dye inks, preferably by steam treating the printed fabric substrate to set the print; and (f) washing the digitally printed (steam-treated) fabric.

In still another aspect, the present invention pertains to polyester and polyester blend fabric textile article printed according to the above inkjet printing method. Preferably, the fabric is an automotive textile stock.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Inks and Ink Sets

The term "ink set" refers to all the individual inks or other fluids an inkjet printer is equipped to jet. The ink set of the present invention contains at least a cyan, magenta and yellow ink.

The inks of the present ink set are characterized by the presence of particular, specified colorants in an aqueous vehicle. The colorants are disperse dyes, which are substantially insoluble in the aqueous vehicle. These disperse dyes are dispersed by common dispersants and dispersing techniques used in the manufacture of ink jet inks, which dispersants and dispersing techniques are in general well-known to those of ordinary skill in the relevant art.

Reference to the specified dyes is made by their "C.I." designation established by Society Dyers and Colourists, Bradford, Yorkshire, UK and published in the *The Color*

*Index*, Third Edition, 1971. Sources of these dyes are generally well known to those of ordinary skill in the relevant art.

In addition to the CMY inks as defined above, the ink sets in accordance with the present invention may contain differently colored disperse dye inks, as well as different strength versions of the CMY and other inks. For example, the inks sets of the present invention can comprise full-strength versions of the CMY inks, and "light" versions of one or any combination of the CMY inks.

Likewise, five-, six-, seven- and eight-member differently colored ink sets can be constructed. As with the CMY inks, any differently colored inks preferably comprise an appropriately colored disperse dye colorant (one disperse dye or a combination of disperse dyes that result in the appropriate color) in an aqueous vehicle. The additional inks can be selected in any combination. A preferred (but non-limiting) example of an additional ink includes an ink comprising a black disperse dye colorant in an aqueous vehicle.

In another preferred embodiment, the ink set further comprises at least one more additional ink and, optionally, up to four or more additional inks (up to eight or more total). Examples include an additional ink based on a colorant selected from the group consisting of DO41, DO61, DO30 and mixtures thereof (disperse dye orange); a colorant selected from the group consisting of DV57, DV33, DV26, DV36 and mixtures thereof (disperse dye violet); and a disperse dye black. In each case except for the black, the specified dye is preferably the primary or sole colorant in the ink.

The disperse dye black can be a single black disperse dye, but is preferably obtained by combining various disperse dyes in a single ink to obtain a black ink. The component disperse dyes are chosen by well-known techniques. Candidate disperse dyes to be combined to produce a black can include combinations of the aforementioned dyes and other disperse dyes. The black ink must be tested as a black, not just as the component dyes. One example of a black disperse dye is a combination of DR92, DB77 and DY114. DR92 when used alone does not satisfy the lightfastness criteria preferred for the disperse dye inks used in this invention but, in combination with other disperse dyes, does produce a lightfast black.

The disperse dyes used in the CMY inks in the present ink sets individually have acceptable lightfastness on a variety of candidate textiles, and other disperse dyes colorants for use in other inks should be chosen to have acceptable lightfastness as well on the particular candidate textile. For colorants comprising combinations of dyes, lightfastness should be judged on the combination.

Preliminary lightfastness screening can be done on candidate textiles digitally printed with disperse dye inks by using tests procedures according to AATCC Method 16. This test methodology, however, may not always predict good performance with the more rigorous testing required for automotive textiles. Thus, for a preferred use of the inks sets in accordance with the present invention to print textiles used in automobile interiors, the test procedures should simulate the exposure of such printed textiles to conditions experienced when the textiles are used in automotive interiors. Various tests exist, but a common and preferred test is the well-established Ford DVM-0067-MA.

Lightfastness is judged in accordance with the present invention by testing textiles at two levels of light exposure, and the printed textiles are considered to pass if the rating is a 4 or higher using the AATCC rating scale of 5 for excellent color retention, 4 for very good, 3 for good, 2 for fair and 1 for poor. In addition, when there is loss of color, the loss can be judged according to the following qualitative criteria.

| Rating | Observed color change. |
| --- | --- |
| B | Bleaching |
| D | Darkening |
| F | Fade |
| BR | Bronzing |
| M | Mottled |
| Y | Yellowing |
| G | Graying |
| DC | Discolor |

The disperse dye inks in the ink sets according to the present invention should all produce digitally printed textiles in which the lightfastness rating is at least about 4 (very good). Preferably, the lightfastness of textiles printed with the inks in the ink set should all be similar (substantially the same), such that none of the inks should have a disproportionate loss in color relative to the other colors. For example, if two of the inks in the ink set are rated about 4, the third ink should perform similarly (be rated about 4). If additional inks are used they should also perform similarly. Further, when the colors of the digitally printed textiles are rated according the qualitative color loss criteria, they should perform according to the B, bleaching or F, fade criteria.

Still further, it should be noted that penetration of the dye colorant into the substrate, and bleed between adjacent printed colors, are in part related to choice of dye, and not all dyes have similarly good penetration and bleed characteristics under the same conditions. The dyes specified herein have been found particularly advantageous as regards penetration and bleed characteristics, particularly when printed on the preferred substrates as described below.

Aqueous Vehicle

The vehicle is a carrier for the colorant. An "aqueous vehicle" refers to a vehicle comprised of water or a mixture of water and at least one water-soluble organic solvent (co-solvent). Selection of a suitable mixture depends on requirements of the specific application, such as desired surface tension and viscosity, the selected colorant, and compatibility with substrate onto which the ink will be printed.

Examples of water-soluble organic solvents include alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether An aqueous vehicle will typically contain about 30% to about 95% water with the balance (i.e., about 70% to about 5%) being the water-soluble solvent.

Additives

Other ingredients (additives) may be formulated into the inkjet ink, to the extent that such other ingredients do not interfere with the stability and jettablity of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of from about 0.01 wt % to about 5 wt %, and preferably from about 0.2 wt % to about 2 wt %.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)aminomethane ("Trizma" or "Tris").

Inclusion of sequestering (chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N",N"'-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70 wt % to about 99.8 wt %, and more typically from about 80 wt % to about 99 wt %. Colorant is generally present in amounts of about 15 wt % or less (dye solids), and preferably from about 0.25 wt % to about 15 wt %. For automotive textile applications, the colorant is typically in the range of from about 0.25 wt % to about 12 wt %.

Weight percent in the context of the present invention, unless otherwise specified, is based on the total weight of the ink.

Other ingredients (additives), when present, generally comprise less than about 15 wt %. Surfactants, when added, are generally in the range of from about 0.2 wt % to about 3 wt %. Polymers can be added as needed, but will generally be less than about 15 wt %.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the inkjet printing device it comes in contact with, and it should be essentially odorless and non-toxic.

Substrate

The instant ink set is especially advantageous for printing a substrate that is synthetic polyester or polyester blend fabric, and particularly textile stock suitable for automotive textiles. An example of a polyester fabric is a Poly Suede, style 700-1 from Testfabrics, Inc. West Pittston, Pa. 18643.

These types of fabric are commonly pretreated prior to printing. Suitable pretreatments for such fabrics are in general well known to those of ordinary skill in the relevant art, and application of the pretreatment to the fabric can be any convenient method, such methods also being generally well known to those of ordinary skill in the relevant art.

One example of a preferred pretreatment application method is referred to as padding. In padding, a fabric is dipped in the pretreatment solution, then the saturated fabric is passed through nip rollers that squeeze out the excess solution. The amount of solution retained in the fabric can be regulated by the nip pressure applied by the rollers. Other pretreatment techniques include spray application wherein the solution is applied by spraying on the face or face and back of the fabric. The wet pick-up of pretreatment solution is preferably from about 20 and about 100% wet pick-up, more preferably from about 75 to about 85% wet pick-up.

After application of pretreatment, the fabric is typically dried in any convenient manner, generally at a temperature of less than 100° C., until the fabric is dry. The final percent moisture is (approximately) equal to the equilibrium moisture of the pretreated fabric at ambient temperature, and can vary somewhat depending on the relative humidity of the surrounding air.

The resins remaining in the fabric after drying provide the absorbent layer for the inkjet inks during printing. It will be appreciated that sufficient resin must be present to absorb the ink load applied. On the other hand, the presence of too much resin may prevent proper penetration. Routine optimization will reveal appropriate coating levels for a given printer and ink set.

The pre-treated fabric should be kept clean, dry and below 50% relative humidity prior to printing.

Printing Method

Printing can be accomplished by any inkjet printer equipped for handling and printing fabric. Commercial printers include, for example, the Dupont™ Artistri™ 3210 and 2020 printers, and the Mimaki TX series of printers.

The amount of ink laid down on the fabric can vary by printer model, by print mode (resolution) within a given printer and by the percent coverage need to achieve a given color. The combined effect of all these considerations is grams of ink per unit area of fabric for each color. In one embodiment, ink coverage is preferably from about 5 to about 17 grams of ink per square meter of fabric. There is a balance between the ink density needed to achieve a desired color and the absorption capacity of the coating resins in the pretreatment.

The digitally printed fabric will typically be post-treated according to procedures well known in the textile art. Preferably, the digitally printed fabric should be stored at 25° C. and less than 50% relative humidity (but for no more than 3 days) prior to fixation.

Preferably the fixation can be done by either Thermofix (dry heat fix) at 200° C. (392° F.) for 60 seconds (done in tenter frame or stenter), pressure steam fix at 140° C. (284° F.) for 25 minutes (recommended for textured yarn), or superheated steam fix at 170-180° C. (338° F.-356° F.) for 7-10 minutes (recommended for textured yarn).

After the fixation, the preferable wash-off utilizes the following steps:

(1) rinse in cold water for 10-15 minutes; and (2) Fill bath at 70° C. (158° F.) and reduction clear (remove excess dye) for 10-15 minutes using 1 gram per liter NaOH (Sodium hydroxide), 2 grams per liter $Na_2S_2O_4$ (Sodium hydrosulfite) and 1 gram per liter anionic surfactant.

Any anionic surfactant recommended for washing of disperse dyes on polyester can be used.

EXAMPLES

Preparation of Dispersant Polymer

A 12-liter flask was equipped with a mechanical stirrer, thermometer, $N_2$ inlet, drying tube outlet, and addition funnels. Tetrahydrofuran (THF, 3750 gm) and p-xylene (7.4 gm) were charged to the flask. A catalyst (tetrabutyl ammonium m-chlorobenzoate, 3.0 ml of a 1.0 M solution in acetonitrile) was then added. Initiator (1,1-bis(trimethylsiloxy)-2-methyl propene, 291.1 gm (1.25 moles)) was injected. Feed I (tetrabutyl ammonium m-chlorobenzoate, 3.0 ml of a 1.0 M solution in acetonitrile) was started and added over 180 minutes. Feed II (trimethylsilyl methacrylate, 1975 gm (12.5 moles)) was started at 0.0 minutes and added over 35 minutes. One hundred minutes after Feed II was completed (over 99% of the monomers had reacted), Feed III (benzyl methacrylate, 2860 gm (16.3 moles)) was started and added over 30 minutes.

At 400 minutes, 720 gm of methanol was added to the above solution and distillation begun. During the first stage of distillation, 1764.0 gm of material was removed. Then more methanol (304.0 gm) was added and an additional 2255.0 gm of material was distilled out. The remaining polymer solution was 49.7 wt % solids.

2-pyrrolidone (2-P) was then added to obtain a 40 wt % solution of the block copolymer with 55 wt % 2-P The block copolymer had a composition of BZMA//MAA 13//10, with a molecular weight (Mn) of 3,200 and an acid value of 3.52.

Preparation of Disperse Dye Dispersion 12.5 parts by weight of the dispersant solution of the 13//10 block copolymer was added to 25 parts by weight of dye and water to make up 77 parts by weight. The block copolymer was neutralized with N,N-dimethylethanolamine, and this was mixed with a high-speed dispersion blade type mixer until a uniform, fluid mixture was obtained. An additional 6 parts by weight water was then added.

This dye dispersion was processed in a bead mill until the mean particle size of 0.05 to 0.2 microns was obtained. This was let down with about 17 parts by weight water to obtain a dye dispersion with 25 wt % dye solids and 5 wt % dispersant solids.

Inks were prepared according to the formulations in the following tables wherein amounts are ink weight percent of the total weight of ink. The dispersion of the dye was added to the other ink components to prepare the inks. Colorants were "inkjet grade" meaning that they were relatively pure and free of excessive amounts of salts. The colorants were used as received or further purified by common techniques for disperse dyes such that sufficient purity was obtained for application in inkjet printing. In each case the dispersed dye/dispersant ratio was 5. N,N-dimethylethanolamine was used to adjust pH. Surfynol® 440 is a surfactant from Air Products Corp (Allentown, Pa., USA). Proxel™ GXL is a Biocide from Avecia (Wilmington, Del., USA). Dowanol® DPM was obtained from Dow Chemical (Midland Mich.).

Disperse Dye Ink Examples

| | Magenta | Cyan-1 | Light Cyan-1 | Yellow | Cyan-2 | Black | Violet | Comp. Magenta | Comp. Light Mag. |
|---|---|---|---|---|---|---|---|---|---|
| Ethylene Glycol | 23.0 | 23.0 | 23.0 | 23.0 | 23.0 | 23.0 | 23.0 | 23.0 | 23.0 |
| Glycerol | 8.0 | 13.0 | 13.0 | 8.0 | 13.0 | 8.0 | 9.0 | 8.0 | 13.0 |
| LEG-1 | 7.0 | 9.0 | 9.0 | 8.0 | 9.0 | 4.0 | 9.0 | 7.0 | 9.0 |
| Dowanol® DPM | 5.0 | 5.0 | 5.0 | 5.0 | 5.0 | 5.0 | 5.0 | 5.0 | 5.0 |
| Surfynol® 440 | 1.0 | 1.0 | 1.0 | 1.0 | 1.0 | 1.0 | 1.0 | 1.0 | 1.0 |
| Polyethylene glycol | | | 1.0 | | 1.0 | | | | 1.0 |
| Proxel™ GXL | 0.15 | 0.15 | 0.15 | 0.15 | 0.15 | 0.15 | 0.15 | 0.15 | 0.15 |
| 2-Pyrrolidone | 0.4 | 0.4 | 0.4 | 0.4 | 0.4 | 0.72 | 0.4 | 0.4 | 0.4 |
| Disperse Dye in Dispersion (wt % dye) | DR86 (6.9) | DB60 (5.0) | DB60 (0.5) | DY114 (5.0) | DB77 (5.0) | footnote 1 | DV57 (4.0) | DR92 (6.9) | DR92 (0.5) |
| Water | Bal. to 100% | Bal. to 100% | Bal. to 100% | Bal. to 100% | Bal. to 100% | Bal. to 100% | Bal. to 100% | Bal. to 100% | Bal. to 100% |
| Properties | | | | | | | | | |
| pH | 8.4 | 8.4 | 8.4 | 8.4 | 8.4 | 8.5 | 8.4 | 8.4 | 8.3 |
| Viscosity (cps, 25° C.) | 7.2 | 8.0 | 8.0 | 7.5 | 7.5 | 8.1 | 8.0 | 7.2 | 8.0 |
| Surface Tension (dyne/cm at 25° C.) | 30.1 | 30.0 | 30.0 | 30.0 | 30.0 | 31.3 | 28.4 | 30.1 | 30.0 |

Footnote 1—Black dye is a combination of DR 92 (2 wt %), DB77 (3.9 wt %) and DY114 (0.7 wt %).

Each of these inks were tested for long term storage stability by heating to 70° C. for 1 week, and then the physical properties were retested. If the physical property differences are less than +20%, the ink was judged to be stable. Each of the inks listed above passed this test and were considered to be stable.

Print Tests

A DuPont™ Artistri™ 2020 printer was equipped with the cyan, yellow, magenta and other disperse dye inks as described above. Tests were conducted on poly suede (a polyester from Testfabrics, style number 700-1) that had been pretreated in a manner as generally described above. 9×9" blocks of the fabric were printed (solid colors) at 540 dpi/100% ink coverage. After printing, the blocks were autoclaved at 120° C./60 minutes and reduction cleared at 70° C./10 minutes. After post treatment, the prints all showed good color and good penetration.

Specimens of the resulting fabric were cut, and put into appropriate specimen holders, then placed in a Xenon Arc Apparatus (CI5000 model from Atlas Laboratory Weather Testing) for lightfastness testing. Exposure conditions were as follows.

| Cycle: | 3.8 hours light, 1 hour dark |
|---|---|
| Filters: | Quartz Inner, Borosilicate S Outer, Lantern with SF-5, & 420 nm Interference |
| Irradiance: | 1.06 W/m$^2$ @ 420 nm |
| Black Panel Temperature: | 89° C. (light), 38° C. (dark) |
| Dry Bulb Temperature: | 62° C. (light), 38° C. (dark) |
| % RH | 50% (light), 95% (dark) |

Samples received radiant exposure of 451.20 kJs/m$^2$ @ 420 nm and 902 kJs/m$^2$, then the samples were evaluated for color.

Each of the blocks was tested for lightfastness according to the methodology described above, and the results are presented below.

Lightfastness Performance of Disperse Dyes

| Color | Color Index | AATCC |
|---|---|---|
| Cyan-2 | DB77 | 5 |
| Cyan | DB60 | 4-5F |
| Light Cyan | DB60 | 4F |
| Yellow | DY114 | 4-5F |
| Violet | DV57 | 4F |
| Black | DR92, DB77. DY114 | 4-5F |
| Magenta | DR86 | 5 |
| Comparative Magenta | DR92 | 2-3D |
| Comparative Light Magenta | DR92 | 2-3F |

The invention claimed is:

1. An inkjet ink set comprising at least three differently colored inks, wherein:
   at least one of the colored inks is magenta in color and comprises a first aqueous vehicle and a magenta disperse dye colorant selected from the group consisting of DR60, DR82, DR86, DR86:1, DR167:1, DR279 and mixtures thereof;
   at least one of the colored inks is yellow in color and comprises a second aqueous vehicle and yellow disperse dye colorant selected from the group consisting of DY64, DY71, DY86, DY114, DY153, DY233, DY245 and mixtures thereof; and
   at least one of the colored inks is cyan in color and comprises a third aqueous vehicle and a cyan disperse dye colorant selected from the group consisting of DB27, DB60, DB73, DB77, DB77:1, DB87, DB257, DB367 and mixtures thereof,
   and wherein the inkjet ink set further comprises a colored ink that is black in color and comprises a fourth aqueous vehicle and a black disperse dye colorant,
   wherein the black disperse dye colorant comprises a DB77, DB92 and DY114, 2. The inkjet ink set of claim 1, further comprising a colored ink comprising a fifth aqueous vehicle and a disperse dye colorant selected from the group consisting of DV26, DV33, DV36, DV57 and mixtures thereof; and/or a colored ink comprising a sixth aqueous vehicle and a disperse dye colorant selected from the group consisting of DO30, DO41, DO61, and mixtures thereof.

3. The inkjet ink set of claim 1, or 2, wherein in the disperse dye yellow colorant is selected from the group consisting of DY64, DY71, DY86, DY114 and mixtures thereof;
   and/or the disperse dye magenta colorant is selected from the group consisting of DR60, DR82, DR86, DR86:1 and mixtures thereof; and/or the disperse dye cyan colorant is selected from the group consisting of DB27, DB60, DB73, DB77, DB77:1 and mixtures thereof.

4. The inkjet ink set of claim 1, wherein the inks have a surface tension in the range of about out 20 dyne/cm to about 70 dyne/cm at 25° C, and a viscosity of 30 cP or less at 25° C.

5. The inkjet ink set of claim 1, wherein the inks comprise from about 70 wt % to about 99.8 wt % aqueous vehicle, and from about 0.25 wt % to about 15 wt % disperse dye colorant, based on the total weight of the ink.

6. The inkjet ink set of claim 1, wherein the inks, when digitally printed onto a textile substrate, produce digitally printed textiles in which the lightfastness rating is at least about 4 when measured in accordance with AATCC Method 16.

7. The inkjet ink set claim 1, wherein the inks, when digitally printed into a textile substrate, produce digitally printed textiles in which the lightfastness of the digitally printed textiles is substantially the same for all of the inks in the ink set.

8. A method for ink jet printing onto a fabric substrate, comprising the steps of:
   (a) providing an ink jet printer that is responsive to digital data signals;
   (b) loading the printer with a fabric substrate to be printed;
   (c) loading the printer with an inkjet ink set as set forth in any one of claims 1 or 2; and
   (d) printing a print onto the fabric substrate using the inkjet ink set in response to the digital data signals.

9. The method of claim 8, further comprising the steps of:
   (e) fixing the disperse dye inks, and
   (f) washing the digitally printed fabric.

10. The method of claim 9, wherein substrate is a polyester or polyester blend.

* * * * *